US007596999B1

(12) United States Patent
Vitarelli

(10) Patent No.: US 7,596,999 B1
(45) Date of Patent: Oct. 6, 2009

(54) SEDIMENT MONITOR FOR A STORMWATER RECEIVING SYSTEM

(75) Inventor: Ronald R. Vitarelli, Hebron, CT (US)

(73) Assignee: Stormtec, LLC, Wethersfield, CT (US)

( * ) Notice: Subject to any disclaimer, the term of this patent is extended or adjusted under 35 U.S.C. 154(b) by 224 days.

(21) Appl. No.: 11/450,165

(22) Filed: Jun. 9, 2006

Related U.S. Application Data

(60) Provisional application No. 60/689,330, filed on Jun. 10, 2005.

(51) Int. Cl.
*G01F 23/56* (2006.01)
(52) U.S. Cl. .......................................... 73/319
(58) Field of Classification Search .......... 73/305–319, 73/323, 322.5; 116/228, 229
See application file for complete search history.

(56) References Cited

U.S. PATENT DOCUMENTS 3,691,839 A * 9/1972 Lasher .......................... 73/322
4,715,966 A * 12/1987 Bowman ....................... 210/800
6,530,274 B1 * 3/2003 Philbeck ......................... 73/314

FOREIGN PATENT DOCUMENTS

CA          2278271  A1 *  1/2001

* cited by examiner

*Primary Examiner*—Hezron Williams
*Assistant Examiner*—Tamiko D Bellamy
(74) *Attorney, Agent, or Firm*—C. Nessler

(57) ABSTRACT

Apparatus for monitoring the amount of sediment carried into and deposited within an underground stormwater-receiving system comprises a high surface area float that moves up and down within a chamber of the system. A rod extends upwardly from the float and is slidably contained within a tube that runs from the top of the chamber and to the soil surface. The top of the rod is visible to a worker on the surface. When storm water drains away, the float comes to rest on such sediment as has accumulated in the bottom of the chamber. Thus, the amount of sediment is determinable according to the changed rest-position of the rod.

19 Claims, 3 Drawing Sheets

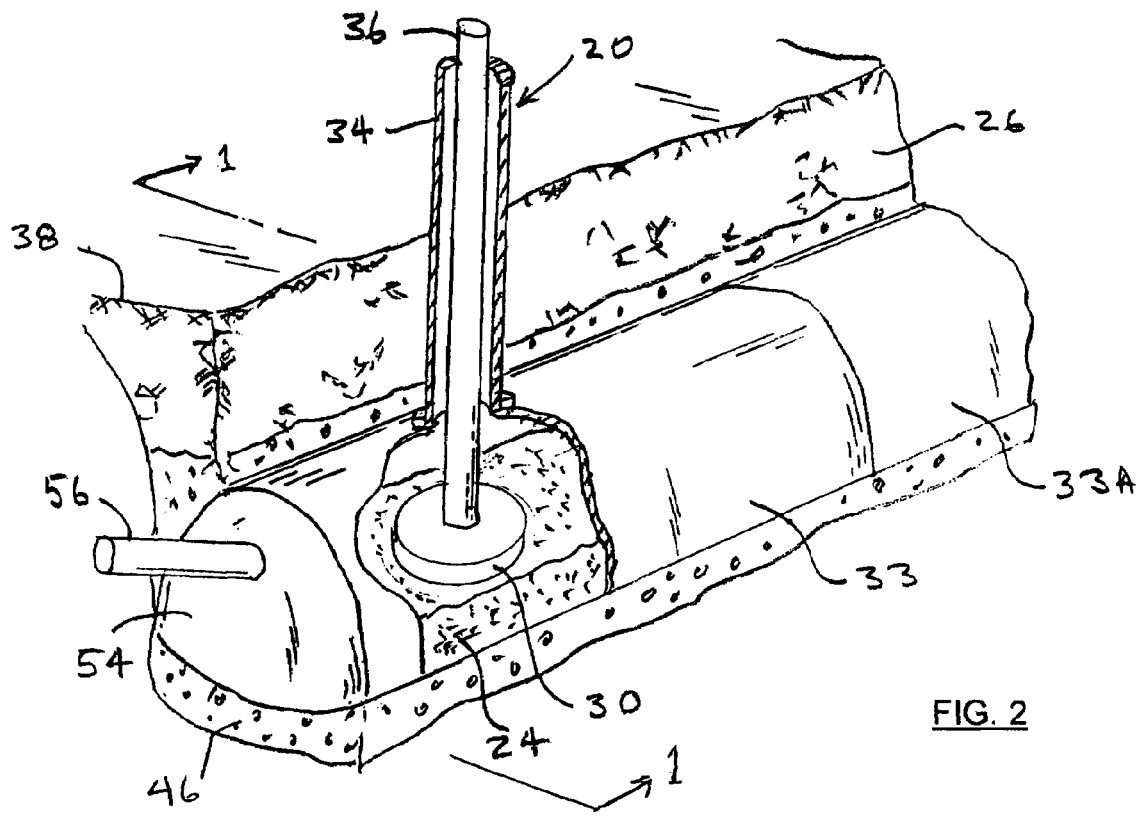
FIG. 2
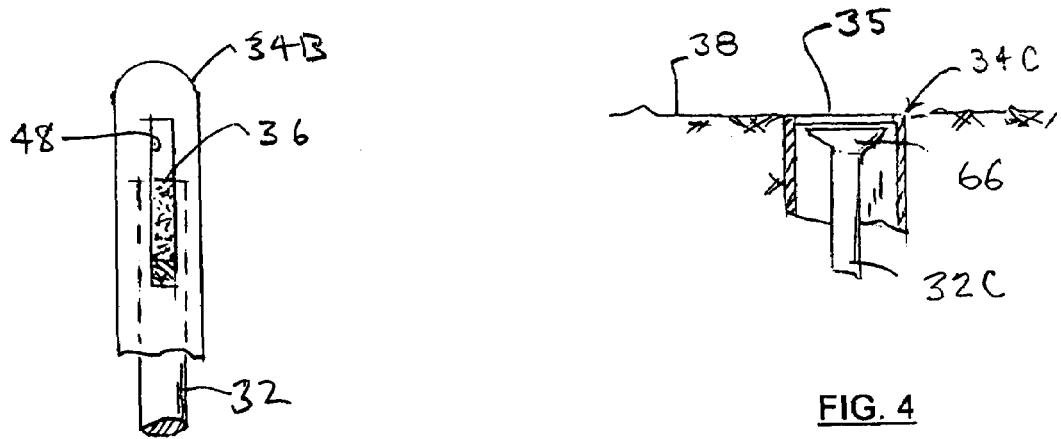
FIG. 3
FIG. 4

SEDIMENT MONITOR FOR A STORMWATER RECEIVING SYSTEM

This application claims benefit of provisional patent application Ser. No. 60/689,330, filed Jun. 10, 2005.

TECHNICAL FIELD

The present invention relates to underground apparatus for receiving stormwater, in particular to means for monitoring the level of sediment which accumulates within such stormwater systems.

BACKGROUND

Stormwater runoff from parking lots and streets is often run to catch basins which are interconnected by underground pipes which discharge the water somewhere. In the past, the discharge point was often a low surface elevation point of the surrounding terrain or a nearby water course. However, in recent years environmental regulations have required that the water only be gradually flowed into a stream or natural water course. Thus, in one approach, to which the present invention relates, water is flowed to a specially constructed underground reservoir, in particular to an array of pipes or chambers which has been buried within porous medium such as crushed stone. A familiar subterranean storm water system is comprised of rows of arch shape cross section molded chambers. See Moore et al. U.S. Pat. No. 5,890,838 and Maestro U.S. Pat. No. 6,361,248 and literature from Stormtech LLC, Wethersfield, Conn., U.S., for examples of storm water systems. Stormtech® chambers of the present assignee are a well known commercial product used to construct such systems.

The so-called "first flush," or initial quantity of surface water which runs off into the drainage system, often carries with it suspended solids, such as sand, sticks, paper, and other debris which has accumulated on the surface since the last storm. Larger suspended or entrained matter is typically removed from the water by surface gratings and catch basins. Sometimes the water is also flowed through a commercial separator device, such as hydrodynamic separator, to further remove suspended material. In most instances, solids, particularly dirt and fine sand, will inevitably be carried along further and will accumulate with time in subterranean storm water structures. Ultimately the systems can become be clogged with the debris, and thus they have to be periodically cleaned.

An improvement in underground stormwater system for dealing with entrained matter, and with which the present invention is useful, comprises an Isolator™ row of chambers. An Isolator row is a solids-retention subsystem of the underground storm water receiving system, like that described in U.S. Pat. No. 6,991,734 of J. Smith et al. A row of chambers which is spaced apart from the main array of underground chambers receives first the water from the drainage system. The Isolator row captures the preponderance of entrained or suspended solids in the water, and the water then flows through the surrounding crushed stone medium into the other chambers of the system. The Isolator row system makes it easier to maintain a stormwater system, since solids in unknown quantities are not distributed about the often-large and difficult-to-access array of chambers.

In order to maintain the function of a underground storm water systems, with or without the use of an Isolator row, periodic cleaning is necessary. If the accumulated solid matter is not removed, then the useful volume of the system and the retention/detention capacity can be unacceptably reduced. To maintain the advantage an Isolator row provides, or to maintain the function of the whole system when it is not present, it is necessary to periodically remove debris. Commonly, debris is removed by devices suited to jet loose and suction away the material. While cleaning can be done on a periodic scheduled basis based on experience, it is more efficient and economic to inspect the system periodically to see if and when cleaning is needed. Inspection in the past has been carried out by use of access ports. A maintenance worker can look down, or probe through, an access port which extends vertically to the surface above the system. The worker can also enter the system by means of manholes at the ends of each row when they are provided However, it is a problem that the inspection itself may not be timely. The rate at which debris accumulates can vary widely over time or from one installation to the next. And accessing the system can interfere with the ordinary use of the overlying surface, can take too much time, and can be shunned by workers, particularly in bad weather. The lack of a good monitoring of sediment within a system can risk failure of the system to function effectively, and could produce untoward effects that are costly to remedy.

While it might seem logical to install an automatic monitoring system, there are a number of factors which make unusual demands on the monitoring system. Typically, they include that the system is outside, that it may not be conveniently located near a power source, that there can be turbulent swirling flow of water and debris within the chamber, that the water may contain salt used for de-icing and therefore be corrosive, that small creatures may visit the system and gnaw on instruments, and that the powerful devices used for emptying sediment could cause damage to any instrumentation.

Thus, it is an object of the present invention to provide a means for inspection or monitoring of the sediment within a storm water system, which means is accurate, simple, reliable, and economic to build and maintain. A further object is to provide a means for monitoring which provides a continuing indication of the system's sediment condition to an unskilled person. A further object is to provide a means which requires minimal or no maintenance, and withstands other maintenance procedures.

SUMMARY

In accord with the invention, apparatus for monitoring the amount of sediment within an underground stormwater-receiving chamber comprises a float which moves up and down within the chamber, and a rod which runs to the surface, connected to the float. Preferably, the rod extends directly upward from the top of the float. Less preferably, the rod-float connection may be through a linkage. The rod runs within a tube which is attached to the top of the chamber. The rod extends to or beyond the surface of the overlying soil. In operation, the float goes up and down as a function of the level of water in the chamber; and, that makes the rod move up and down. When, after having received sediment laden stormwater, the water by design drains from the chamber, the float moves downwardly until it rests on and is supported by the sediment at the bottom of the chamber. Thus, the rest position of the rod will be different from its original position. A worker observing the top end of the rod can thus readily monitor how much sediment remains in the chamber.

Preferably, the fit between the interior of the tube structure and rod is loose, to inhibit possible complicating effects of any debris which enters the tube with water; and, the rod may move from 1 to 10 degrees off vertical. In other embodiments, the tube may have internal guides. Preferably, the tube is closed at the top, so that if the drain system delivers water in a way which wants to over fill the chamber, the air trapped in the tube will inhibit water from entering the tube. The upper end of the tube may be transparent or it may have a window, to make visible the position of the top of the rod. In one embodiment, the top of the tube is a transparent window which is parallel, preferably flush, with the surface of the soil. When sediment causes the rod to rise sufficiently to a predetermined level, the top end of the rod becomes visible at the window. Preferably, the tube is a round pipe which is fastened by a flange to the top of the chamber. Alternately, the tube may comprise another shape structure or other means which both guides the rod and keeps soil from entering the chamber.

The float is preferably a flat bottom disk which is hollow or made of low density plastic or other buoyant material. Since the float is intended to both provide buoyant force and to rest lightly on the sediment it preferably has an aspect ratio (height to width ratio) of less than 1:1; and, it preferably has an area sufficient exert relatively little downward pressure, preferably about 0.5 pounds per square inch or less, on the sediment.

A stormwater-receiving chamber with which the invention is used can be made of any material or have any shape. A good application of the invention is with chambers of an Isolator row solids retention subsystem of the type described in the aforementioned J. Smith patent, where the float and associated assembly are placed within a chamber of the solids retention subsystem.

The invention has the advantage of simplicity and requires no batteries or other power source. It is reliable under the arduous conditions that can attend stormwater systems, described in the Background. It is readily manufactured and does not require great skill to install or maintain.

The foregoing and other objects, features and advantages of the present invention will become more apparent from the following description of preferred embodiments and accompanying drawings.

BRIEF DESCRIPTION OF THE DRAWINGS

FIG. 2 is a partial vertical cross section isometric view of a buried chamber string having a sediment monitor extending upwardly through the soil.

FIG. 3 is a partial side view of the top end of a tube having a window.

FIG. 4 is a vertical cross section view of another embodiment of tube top end.

DESCRIPTION

The invention is described with respect to its use in an underground stormwater dispersal system, of the type described in the aforementioned U.S. Pat. Nos. 5,890,838 of Moore et al. and 6,361,248 of Maestro. A good use of the invention is with one or more chambers of the solids retention subsystem of the stormwater handling apparatus described in the aforementioned U.S. Pat. No. 6,999,734 of J. Smith et al.

The disclosures of the foregoing patents, particularly with respect to the apparatus and use thereof, are hereby incorporated by reference.

Figure 1:
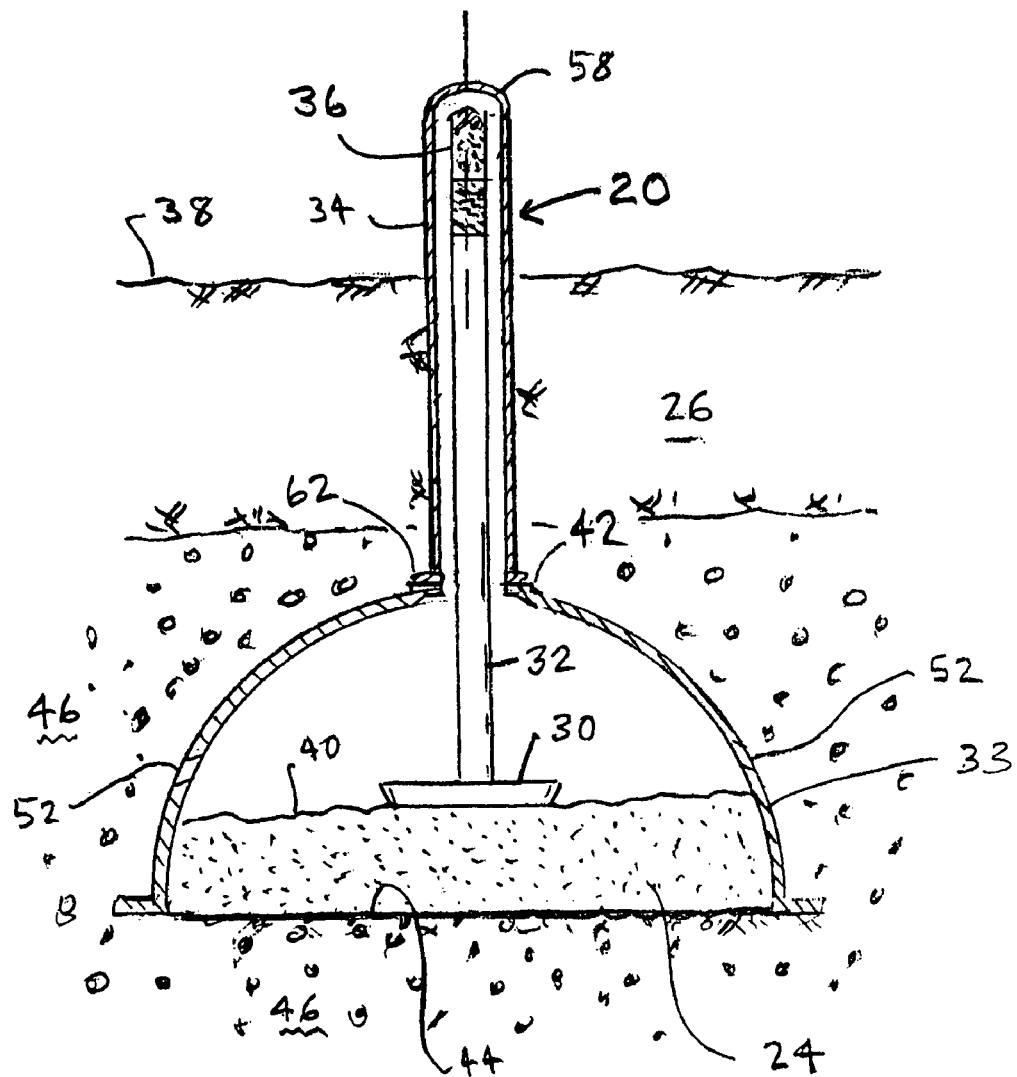
FIG. 1 shows is vertical end view cross section of a buried chamber having a sediment monitor, the float of the monitor resting on sediment contained within the chamber.

In the embodiment of the invention which is first described, the chamber 33 is like one of the chambers 33 of the solids retention subsystem 30 shown in FIG. 1 and FIG. 2 of U.S. Pat. No. 6,991,734. Chamber 33 an arch shape cross section plastic molded open-bottom chamber having perforated sidewalls, such as Stormtech® Model SC310 or Model 740 chambers (Stormtech LLC, Wethersfield, Conn.). Chambers like those of Stormtech LLC are described in patent application Ser. No. 09/849,768 of Kruger et al., filed May 24, 2001, now U.S. Pat. No. 7,052,209, the description and drawings of which are hereby incorporated by reference. In FIG. 2 here, chamber 33 is shown as an end chamber, that is, the last one of a string or row of other like chambers 33A. The chamber has an end cap 54 and a pipe 56 for delivering storm water. The invention may be used with a sole chamber or with any chamber of a row. As described below, other devices are within the scope of the term "chamber".

Chamber 33 is shown as it is typically buried for use within a layer 46 of crushed stone. Soil 26 overlies the crushed stone layer. Pavement may optionally overlie the soil surface 38. FIG. 1 is a vertical transverse cross section through a chamber 33 to which the invention sediment indicator 20 is attached. FIG. 2 is a partial cutaway isometric view of the chamber 33 showing how it connects to an adjoining chamber 33A and how water may enter the chamber. In actual practice, the float would likely be positioned a good distance from the inlet pipe 56, where sediment is most likely to settle.

FIG. 1 and FIG. 2 illustrate how sediment 24 has accumulated within chamber 33, such as might result after a period of use of the chamber and associated system, to help show how the invention works. Mostly sediment will be fine inorganic particulate, e.g., sand, or other suspended or entrained solid particulates, but it may include other materials as mentioned in the Background. The term sediment is used here for convenience, and encompasses any solids which might be carried into a chamber by storm water and then left behind after the storm water has migrated away.

With reference to FIG. 1, sediment 24 lies upon an optional layer of filter fabric 44 which covers crushed stone 46 upon which the base of the chamber rests. Water received in the chamber by means of pipe 56 flows out of the chamber over time by flowing through interstices in the stone. The water flows downwardly and or laterally through chamber sidewall ports 52. The exterior of the chamber may be covered by geotextile filter fabric, to prevent egress of finer sediment, as described in U.S. Pat. No. 6,991,734.

Sediment monitor 20 comprises float 30, rod 32 extending upwardly from the float, and tube 34, which circumscribes the rod. Tube 34 is attached to the top of the chamber. It preferably has a closed top 58 and extends above the surface 38 of the soil 26. It is preferably made of clear plastic, at least at the upper end, so the rod within is visible.

The bottom of the tube 34 is attached to the chamber, such as by means of flange 62 which is bolted to a mating flange 42 at the top of chamber 33. Other known means of attachment to a chamber may be used, such as slip fit of the tube over an upstanding chamber nipple or into a sleeve which extends upwardly from the chamber, or such as by adhesive bonding or welding. Rod 32 is solid or hollow and of any cross section shape, preferably round. It is made of a lightweight material such as structural plastic or thin aluminum tubing. The top of the rod may comprise an extensible piece, so the length of the rod may be adjusted to fit the particular installation and desire of the maintenance worker, as will be better understood with further description.

Rod 32 extends upwardly from float 30, and slides freely within tube 34. A loose fit, as suggested by FIG. 1, is desirable, to avoid any tendency with jamming due to debris presence in the tube. Preferably, the length of the rod and its fit within the tube allows between plus or minus 1 to 10 degrees angling from vertical. In an alternate embodiment, described below, rod guides within the tube may be used.

Float 30 is preferably made of suitable water-buoyant plastic foam, other buoyant material, or it may be a hollow. The float preferably has a disk shape, as shown in FIG. 2; and it has a low height to width aspect ratio, as described below. The volume of the disk is such that the weight of water which it displaces when immersed in water is at least equal to or greater than the weight of the float and rod assembly, i.e., the weight to be lifted by any rising water. Preferably the water displacement is substantially greater than the weight of the float assembly, to overcome any possible friction in the system.

The float is intended to rest on, and not substantially sink into, the surface 40 of the sediment 24. The sediment cohesiveness can vary greatly, according to its character, how much water remains, etc. Thus, the float preferably has a bottom surface area which is large enough to provide a low force per unit area on the sediment, preferably of the order of 0.5 pounds per square inch or less. In one embodiment, the float is plate-like as shown in FIG. 1 and FIG. 2. To avoid a concentration of load which could penetrate into the sediment, the float has an aspect ratio which is less than 1 to 1, where aspect ratio is the ratio of height to diameter (or "equivalent diameter" of a circle having the same area a the bottom of the float). As an example, if the upward force needed is 20 pounds, then the float must have a volume of at least about 670 cubic inches. A circular float of such volume having a diameter of 10 inches would have a height of about 8.4 inches, and an aspect ratio of about 0.8 to 1. Such exemplary float has a bottom surface area of about 80 square inches and will exert a downward force on the surface of the sediment of about 0.25 pounds per square inch, assuming the float assembly in fact weighed 20 pounds. (As indicated above, it would be expected that the buoyant upward force would be greater than the weight of the assembly.)

Figure 7:
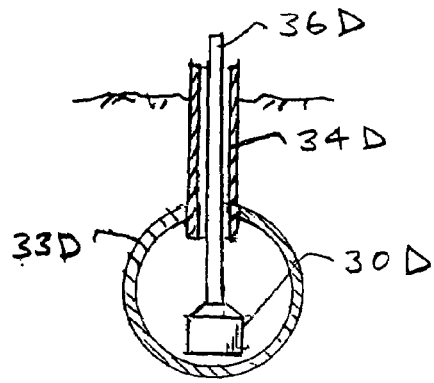
FIG. 7 is an end view like FIG. 1, but simplified, showing a round cross section chamber with a monitor.

The shape and diameter of the float may be varied to fit the dimension of the chamber, to enable the float to move up and down within the chamber interior, over the range of interest with respect to vertical accumulation of sediment or of water presence. While the float is preferably circular (disk-like), it may have other horizontal plane cross sections and may be non-uniform in cross section with height. It typically is permissible for some substantial amount of sediment to accumulate at the bottom of a chamber before cleaning is necessary. Thus, to enable a sufficient range of motion within the chamber, and the cleaning feature mentioned next, the height of the float will be significantly less than the height of the chamber. For instance, the float height will preferably be no more than 50%, preferably less than about 30% of the interior height of the chamber. A further feature of invention is as follows. When sediment at the bottom of the chamber is being removed by devices such as water jets and suction pipes, that act along the length of the bottom of the chamber and adjacent chambers, a worker on the surface may pull upwardly on the rod, to lift the float which is attached to the rod up to the top or roof of the chamber, thereby providing room for the cleaning devices and avoiding the possibility of damage. The float may be molded integral with part or the entirety of the rod, and the top of the float may be shaped to transition into the rod, as shown in FIG. 7, which also will inhibit accretion of debris.

In use, when water is present in the chamber, the float will rise toward the top of the chamber. At that time, a maintenance worker may observe how the chamber is filled. When stormwater flow stops, and when the water present dissipates over time, the float will drop down, so that by and by it comes to rest on top of whatever sediment remains deposited at the bottom of the chamber. The more sediment which remains, the higher will be the rest elevation of float, and the greater will be the change in upward extension of the rod within the tube from its original "empty chamber" elevation. In a simple embodiment, an indicia is provided on the tube or nearby. In another embodiment, suggested by shading in FIG. 1, the upper end 36 of rod 32 preferably has one or more color bands; for instance a yellow band at the top and a red band below, to communicate the amount of motion and the urgency of removing the sediment.

Thus, visual observation of the position of the rod by a maintenance worker at the soil surface will indicate how much sediment is in the chamber. By accessing the top of the rod, a worker can push down on the top of the rod to thus verify that the float is resting on sediment, or when that is not the case, to submerge it in any residual water on top of the sediment.

In the FIG. 1 embodiment the closed top and sides of the tube prevent air within the tube 34 from escaping if and when water rises to the top of the chamber. Sometimes water might want to rise above the elevation of the top of the chamber, such as when there is a hydrostatic force on the chamber due to "backing up" of water in the delivery pipe 56 and the associated upstream drainage system. If such occurs, the captured air within the tube will inhibit water from rising all the way into the tube, thus also preventing any water-carried debris from entering, and thus avoiding potential adverse effects on visibility of or motion of the rod.

In another embodiment of the invention, illustrated by FIG. 3, tube 34B is opaque and has a window opening 48 at its upper end. The window, which may or may not be filled with clear plastic, enables viewing of end 36 of the rod 32. FIG. 7 shows a round across section chamber 33D containing a float 30D. In the embodiment of FIG. 7, tube 34D may be open at the top and the rod 36D may extend beyond the top of the tube. FIG. 7 also shows how a tube 34D may extend into the interior of the chamber.

Figure 5:
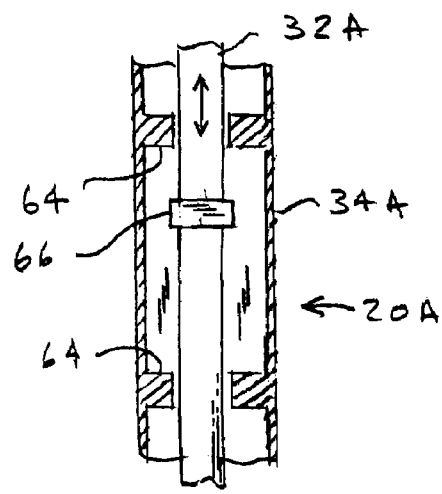
FIG. 5 shows a partial vertical cross section of a tube having internal rod guides.

In a further embodiment, illustrated by FIG. 5, assembly 20A comprises tube 34A having spaced apart upper and lower guides 64 that closely fit section rod 32A. Preferably there is still a somewhat loose fit between the guides and rod, for reasons previously mentioned. The FIG. 5 type of construction may be particularly advantageous when the tube length is short. The guides can also be used to avoid possible unwanted rubbing and abrasion of the rod against the tube. In FIG. 5, optional collar 66 limits vertical motion of the rod by contacting the guides.

In another embodiment, as shown by FIG. 4, the top of the tube 34C is preferably flush with the surface 38 of the overlying soil, and has a horizontal window 35. A disk 66, at the top of the rod 32C (or more simply, the plain top end of the rod, in a variation) can be observed as to its presence or absence at the window. Preferably, the rod length is chosen such that, when the sediment has reached a predetermined level, the disk 66 will be visibly against the window. Thus, a maintenance worker will be provided with a go-no go indicator of whether the sediment level is too high. In still further variations mechanical signal flags may be actuated by the top end of the rod.

While a pipe-like tube has been thus far described in this application the term shall encompass other mechanical structure or means, connected to the top of the chamber, which guides vertical motion of the rod while preventing soil from entering the chamber.

Figure 6:
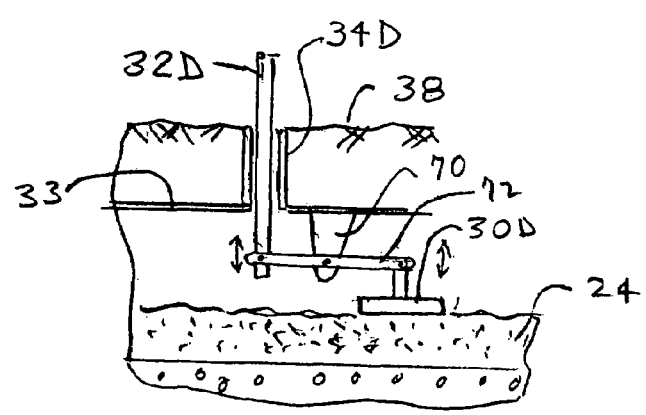
FIG. 6 shows a float which is offset from the rod and connected to it by a linkage.

In still other embodiments of the invention, the float may be offset from the travel line of the rod and may act on the rod by means of mechanical linkage. As an example, as shown in FIG. 6, float 30D is offset from the vertical motion line of rod 32D. Up-down rod motion is actuated by means of pivot lever 72 mounted off a pin on bracket 70 which is positioned between float and rod. In this example, lower rest-elevation of the rod would indicate increased sediment. The length of pivot lever on either side of the bracket pin will amplify or decrease the rod motion relative to float motion. More complex linkages can be used; and, the float may alternately operate a coarse vertical rack, with which is engaged a spur gear and a related dial indicator. Other means of mechanical signaling, known in the art, can be used in substitution of the means described for signaling the float rest-position. Notwithstanding the desire to avoid power source, and the benefit of not having to maintain such, a transducer or a powered sensor can be used to remotely signal the elevation of the rod or float. Obviously, using these more complex approaches can provide more opportunity for failure or more need for maintenance. Thus, the simple embodiment of FIG. 1, where the rod mounts directly on the float is much preferred.

The invention can be used during a storm, when water is flowing into the chamber, to provide a visual indication of the level of water which is present in that part of the system. More than one monitor may be used on a stormwater system.

The invention has been described as it is used with a particular commercial arch shape molded plastic chamber. Other arch shape cross section chambers may be used, made of plastic or any material. A stormwater-receiving chamber with which the invention is used can be made of any material or have any shape. Thus, within the meaning of chamber and the claimed invention are still other kinds of hollow underground devices, or void-creating structures for receiving stormwater. For instance, the invention will be useful with chambers which are corrugated pipe which is non-metal or metal pipe, and which has a cross section which is circular (as shown in FIG. 7), oblong, and some other shape; and with so-called galleries and other not-round and not-arch shape devices which are made of concrete or metal or another material, as they are known in the field, or still to be introduced. The term "chamber" as used in claiming the invention here is intended to encompass the generality of such devices. The invention may be used in other apparatus into which sediment laden water of kinds other than storm water flows and then disappears over time.

Although this invention has been shown and described with respect to a preferred embodiment, it will be understood by those skilled in this art that various changes in form and detail thereof may be made without departing from the spirit and scope of the claimed invention.

I claim:

1. Apparatus installed beneath the surface of soil for receiving a mixture of stormwater and entrained solids and for retaining and for monitoring the amount of solids which is retained as sediment, which comprises:
    a storm water-receiving chamber, buried within a porous medium beneath the surface of soil, shaped for receiving storm water in combination with entrained solids, and configured for allowing the stormwater to flow from the chamber while leaving behind a quantity of said solids in the form of sediment;
    a float, positioned within the chamber, having a combination of shape and weight which causes the float to be movable upwardly in response to rise in the level of water within the chamber; the float movable downwardly for resting on the surface of sediment at the bottom of the chamber when water above the sediment surface is absent from the chamber;
    a rod, interconnected with the float, extending upwardly though the top of the chamber; and,
    a vertically extending tube, attached to the top of the chamber, for containing and guiding vertical motion of the rod;
    wherein the float has a volume sufficient to displace water having weight equal to or greater than the downward force which results from the weight of the float and rod, so that the float and rod move upwardly when water within the chamber rises; and
    wherein the bottom surface area of the float is sufficient to support the float on the surface of sediment within the chamber without substantially sinking into the sediment, against the downward force which results from the weight of the rod and float, when water above the sediment surface is absent from the chamber.

2. The apparatus of claim 1 further comprising guides, extending inwardly from the interior of the tube, for guiding the vertical motion of the rod.

3. The apparatus of claim 1 wherein the tube extends vertically above the surface of the soil within which the chamber is buried.

4. The apparatus of claim 1 wherein the tube upper end is closed, so that air within the chamber cannot flow upwardly through the tube.

5. The apparatus of claim 3 wherein the tube upper end is closed, wherein the at least a portion of the upper end of the tube is transparent, to make visible the position of the rod within the tube.

6. The apparatus of claim 4 wherein the upper end of the tube further comprises: a window which is transparent and parallel with the surface of the soil; wherein the rod length is sufficient so that the upper end rod is in proximity to the window when the float is raised from the elevation of the base of the chamber by sediment within the chamber.

7. The apparatus of claim 3 wherein the tube is non-transparent, further comprising: a window opening in the side of the upper end of tube so the upper end of the rod is visible when the rod moves upwardly within the tube.

8. The apparatus of claim 1 wherein the rod is rigidly connected to the top of the float and extends upwardly within in the tube therefrom, so that the rod rises when water rises in the chamber.

9. The apparatus of claim 8 wherein the fit between the exterior of the rod and the interior of the tube along the length of the tube is sufficiently loose to enable the rod to angle within the tube between 1-10 degrees from the vertical.

10. The apparatus of claim 1 wherein the top of the float contacts the top of the chamber when the float and rod are raised sufficiently upwardly; the float having a height which is less than half of the height of the chamber interior.

11. The apparatus of claim 1 wherein the float has an upward motion path which is offset from the vertical motion path of the rod, further comprising: a linkage for interconnecting the rod and float.

12. The apparatus of claim 1 wherein the rod and tube are circular.

13. The apparatus of claim 1 wherein the height to width aspect ratio of the float is less than 1 to 1.

14. The apparatus of claim 1 further comprising sediment lying on the bottom of the chamber; wherein, when the chamber contains no water which provides an upward buoyant force on the float, so that the float thus rests on sediment at the bottom of the chamber, the area of the bottom of the float where it rests on the sediment in combination with the downward force due to the weight of the float and rod is sufficient to provide less than 0.5 pounds per square inch of down force on the surface of the sediment.

15. The apparatus of claim 14 wherein the float is a disk having a flat bottom.

16. The apparatus of claim 1 wherein the tube further comprises a flange at the bottom thereof, the flange fastened to the top of the chamber.

17. The apparatus of claim 1 wherein the chamber has an arch shape cross section and is interconnected with a multiplicity of other chambers.

18. The apparatus of claim 17 further comprising an array of interconnected chambers spaced apart from said stormwater-receiving chamber, wherein said stormwater-receiving chamber is part of a solids retention subsystem spaced apart from said array.

19. The method of receiving stormwater and for monitoring the amount of sediment which is retained within an underground stormwater-receiving chamber buried beneath the surface of soil, wherein the sediment is periodically deposited into the chamber by stormwater that subsequently dissipates, leaving behind the sediment in the bottom of the chamber, which comprises:

providing a chamber for receiving a flow of stormwater in combination with solids which form sediment deposits within the chamber;

placing a buoyant float within the chamber;

running a rod interconnected with float upwardly through a tube at the top of the chamber, wherein the float and rod move vertically with changing water level within the chamber; and, wherein the rod is visible at the surface at some point during said water level change;

providing the float with (a) bottom surface area sufficient to support the float on the surface of sediment at the bottom of the chamber, in the absence of any water which buoys the float, the downward force on the float which results from the weight of the rod and float; and (b) volume sufficient to displace water which has weight equal to or greater than the downward force on the float which results from the weight of the float and rod, so that the float and rod move upwardly when water within the chamber rises; and, flowing stormwater in combination with entrained solids into the chamber, then allowing said solids to settle within the chamber as sediment, and then allowing stormwater to flow away from the chamber;

observing the vertical position of the rod relative to the surface of the soil or another reference point, to thereby monitor the amount of sediment which is at the bottom of chamber when there is insufficient water in the chamber to provide buoyant upward force on the float.

\* \* \* \* \*